(12) United States Patent
Hata

(10) Patent No.: US 8,399,123 B2
(45) Date of Patent: Mar. 19, 2013

(54) PACKING MATERIAL FOR BATTERY CASE AND BATTERY CASE

(75) Inventor: Hiroshi Hata, Isehara (JP)

(73) Assignee: Showa Denko Packaging Co., Isehara-shi (JP)

( * ) Notice: Subject to any disclaimer, the term of this patent is extended or adjusted under 35 U.S.C. 154(b) by 24 days.

(21) Appl. No.: 12/599,704

(22) PCT Filed: May 14, 2008

(86) PCT No.: PCT/JP2008/058852
§ 371 (c)(1),
(2), (4) Date: Nov. 11, 2009

(87) PCT Pub. No.: WO2008/143089
PCT Pub. Date: Nov. 27, 2008

(65) Prior Publication Data
US 2010/0227213 A1   Sep. 9, 2010

(30) Foreign Application Priority Data

May 21, 2007 (JP) ................................. 2007-133670

(51) Int. Cl.
*H01M 2/02* (2006.01)
(52) U.S. Cl. ...................................................... 429/163
(58) Field of Classification Search .................. 429/163
See application file for complete search history.

(56) References Cited

U.S. PATENT DOCUMENTS 4,522,867 A * 6/1985 Hill et al. ...................... 428/220
2009/0130407 A1   5/2009 Hata

FOREIGN PATENT DOCUMENTS

| CN | 1314008 A | 9/2001 |
|---|---|---|
| CN | 1654190 A | 8/2005 |
| JP | 2001 6631 | 1/2001 |
| JP | 2002 216714 | 8/2002 |
| JP | 2003 53884 | 2/2003 |
| JP | 2005 116322 | 4/2005 |
| JP | 2006 198878 | 8/2006 |
| JP | 2006 331897 | 12/2006 |
| JP | 2006331897 A * | 12/2006 |
| JP | 2007 95654 | 4/2007 |

OTHER PUBLICATIONS

U.S. Appl. No. 11/158,548, filed Oct. 30, 2009, Hatta, et al.
Okiyama, Toshiaki "Plastic Film, Kako to oyo", Gihodo Shuppan Co., Ltd., $2^{nd}$ ed., p. 262, (Apr. 5, 1995).
U.S. Appl. No. 13/299,017, filed Nov. 17, 2011, Hata.
Chinese Office Action issued Nov. 16, 2011, in Patent Application No. 200880012870.3 (with English-language translation).
Office Action issued Jul. 9, 2012, in Chinese Patent Application No. 200880012870.3, filed May 14, 2008.

*Primary Examiner* — Karie O'Neill Apicella
(74) *Attorney, Agent, or Firm* — Oblon, Spivak, McClelland, Maier & Neustadt, L.L.P.

(57) ABSTRACT

A battery case material includes a biaxially stretched polyamide film layer as an outer layer, a thermoplastic resin unstretched film layer as an inner layer, and an aluminum foil layer interposed between the two film layers. As the biaxially stretched polyamide film, a biaxially stretched polyamide film having a density of 1,130 to 1,160 $kg/m^3$ is used. In the battery case material, excellent formability can be secured without coating a lubrication giving component, and sufficient volume capacity ratio can be obtained.

11 Claims, 2 Drawing Sheets

PACKING MATERIAL FOR BATTERY CASE AND BATTERY CASE

TECHNICAL FIELD

The present invention relates to a battery case material for, e.g., a lithium-ion secondary battery.

In this specification, the word "aluminum" is used to include the meaning of aluminum and its alloy.

TECHNICAL BACKGROUND

A lithium-ion secondary battery is widely used as a power source for, e.g., notebook computers, video cameras, cellular phones, and electric cars. As such a lithium-ion secondary battery, a lithium-ion secondary battery having a structure in which the circumference of the battery body is surrounded by a case is used. As such a battery case material, it is publicly known that a battery case material has a structure in which, for example, an outer layer made of a stretched polyamide film, an aluminum foil layer, an inner layer made of unstretched polypropylene film are integrally bonded in this order (see Patent Document 1).

Such battery case material is formed into various battery shapes, and therefore, is required to have high deep-drawing formability. To give it high deep-drawing formability, conventionally, for example, fatty acid amide series lubrication giving component is coated onto a surface of an outer layer film to enhance the sliding performance of the battery case material into the die at the time of the molding (see Patent Document 2), or the outer layer film is increased in thickness with respect to the thickness of the aluminum foil layer.

Patent Document 1: Japanese Unexamined Laid-open Patent Publication No. 2001-6631

Patent Document 2: Japanese Unexamined Laid-open Patent Publication No. 2002-216714

DISCLOSURE OF THE INVENTION

Problems to be Solved by the Invention

However, in the structure in which a fatty acid amide series lubrication giving component is coated onto the surface of the outer layer film, a process for coating the lubrication giving component had to be added, and therefore there was a problem that the productivity was low. Furthermore, the lubrication giving component evaporates during vacuum deairing and/or sealing process for the battery, causing adherence of the evaporated component to the processing equipments, which requires a cleaning operation for removing the adhered component. Therefore, there was a problem that the productivity was further decreased.

Further, in the structure in which the outer layer film is increased in thickness with respect to the thickness of the aluminum foil layer, the entire thickness of the battery case material increases, and therefore there was a problem that the volume capacity ratio was decreased.

The present invention was made in view of the above-mentioned technical background, and aims to provide a battery case material and a battery case capable of securing excellent formability without coating a lubrication giving component and also capable of securing a sufficient volume capacity ratio.

Means to Solve the Problems

To achieve the aforementioned objects, as a result of keen studies, the present inventor found a new knowledge that the material and density of the stretched film layer forming the outer layer of the battery case material affects the formability of the battery case material, and completed the present invention. That is, the present invention provides the following means.

[1] A battery case material comprising a biaxially stretched polyamide film layer as an outer layer; a thermoplastic resin unstretched film layer as an inner layer; and an aluminum foil layer interposed between the two film layers, wherein as the biaxially stretched polyamide film, a biaxially stretched polyamide film having a density of 1,130 to 1,160 kg/m$^3$ is used.

[2] The battery case material as recited in the aforementioned Item [1], wherein the biaxially stretched polyamide film layer is 1,142 to 1,146 kg/m$^3$ in density.

[3] The battery case material as recited in the aforementioned Item [1] or [2], wherein the biaxially stretched polyamide film layer is 12 to 50 μm in thickness, the thermoplastic resin unstretched film layer is 20 to 80 μm in thickness, and the aluminum foil layer is 5 to 50 μm in thickness.

[4] The battery case material as recited in any one of the aforementioned Items [1] to [3], wherein the biaxially stretched polyamide film layer and the aluminum foil layer are integrally laminated via a urethane series adhesive layer.

[5] A battery case formed by subjecting the battery case material as recited in any one of the aforementioned Items [1] to [4] to deep drawing or stretch forming.

Effect of the Invention

In the invention as described in the aforementioned Item [1], since the biaxially stretched polyamide film having a density of 1,130 to 1,160 kg/m$^3$ is used as the resin stretched film forming the outer layer, the battery case material is excellent in formability, such as, e.g., deep drawing and/or stretch forming, which enables sharp and deep forming. Thus, excellent formability can be secured without coating a lubrication giving component, and therefore it is not required to add a step of coating a lubrication giving component as required in a conventional technology and it is excellent in productivity. Also, unlike a conventional technology, there is no need to especially increase the thickness of the outer layer film with respect to the thickness of the aluminum foil layer, enabling it to obtain sufficient volume capacity ratio.

In the invention as described in the aforementioned Item [2], the biaxially stretched polyamide film layer is 1,142 to 1,146 kg/m$^3$ in density, and therefore formability, such as, e.g., deep drawing and/or stretch forming, can be further improved, which enables forming of a shape deeper in forming height.

In the invention as described in the aforementioned Item [3], generation of pinholes can be sufficiently prevented and the production cost can be reduced.

In the invention as described in the aforementioned Item [4], since the biaxially stretched polyamide film layer and the aluminum foil layer are integrally laminated via a urethane adhesive layer, sharp forming can be performed.

In the invention as described in the aforementioned Item [5], a battery case having a shape which is sharp and deep informing height can be provided.

Figure 1:
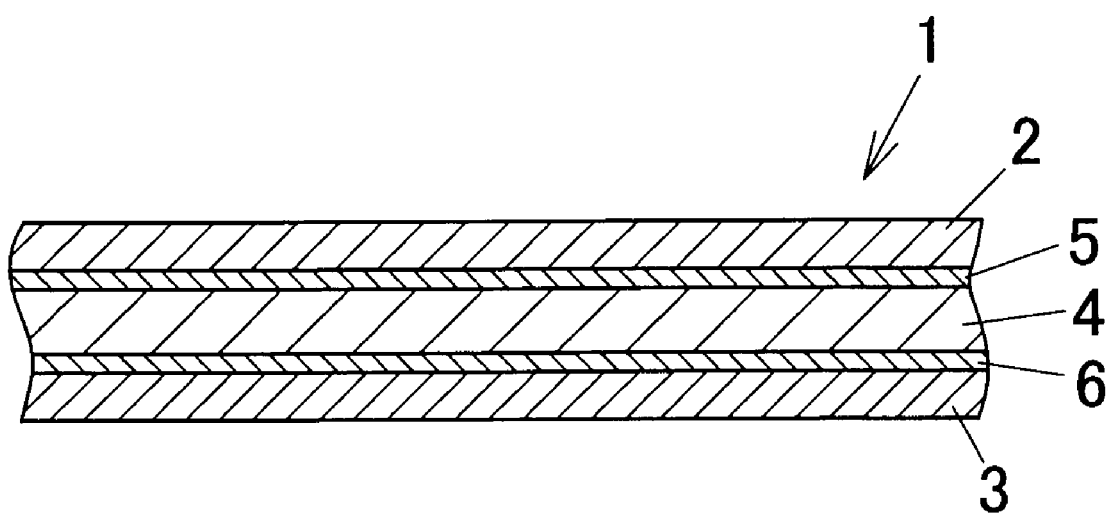
FIG. 1 is a cross-sectional view showing an embodiment of a battery case material of the present invention.

DESCRIPTION OF THE REFERENCE NUMERALS 1 battery case material
2 outer layer (biaxially stretched polyamide film layer)
3 inner layer (thermoplastic resin unstretched film layer)
4 aluminum foil layer

BEST MODE FOR CARRYING OUT THE INVENTION

An embodiment of a battery case material 1 according to the present invention is shown in FIG. 1. The battery case material is used as a battery case material for a lithium-ion secondary battery case. The battery case material 1 has a structure in which a biaxially stretched polyamide film layer (outer layer) 2 is integrally bonded on an upper surface of the aluminum foil layer 4 via a first adhesive layer 5, and a thermoplastic resin unstretched film layer (inner layer) 3 is integrally bonded on a lower surface of the aluminum foil layer 4 via a second adhesive layer 6.

The biaxially stretched polyamide film layer (outer layer) 2 is a member which mainly undertakes a role of securing excellent formability as a battery case material. In other words, its role is to prevent breakage of the aluminum foil due to necking during the forming process. In the present invention, as the aforementioned biaxially stretched polyamide film 2, it is required to use a biaxially stretched polyamide film layer having a density of 1,130 to 1,160 kg/m$^3$. If the density is less than 1,130 kg/m$^3$, detachment between the biaxially stretched polyamide film layer 2 and the aluminum foil layer 4 occurs after the forming process. On the other hand, if the density exceeds 1,160 kg/m$^3$, breakage and/or cracks of the battery case material may occur during the forming, such as, e.g., deep drawing or stretch forming. Above all, it is preferable to use a biaxially stretched polyamide film having a density of 1,142 to 1,146 kg/m$^3$.

In this disclosure, the aforementioned "density" denotes a density measured using a densitometer in conformity with JIS K7112-1999 D method (density gradient tube method). In other words, the "density" denotes a density measured by putting a test piece of the biaxially stretched polyamide film (3 mm×3 mm) into a density gradient tube and reading the height position of the center of gravity of a density float after 24 hours have passed since the test piece was put in.

The density of the biaxially stretched polyamide film can be controlled by, for example, adjusting the thermal fixing temperature during stretch processing. Also, the control can be performed by changing the orientation of the resin crystals by selecting the stretching method (e.g., a simultaneous biaxially stretching method which stretches simultaneously in vertical and horizontal directions and a sequential biaxially stretching method which stretches sequentially in vertical and horizontal directions).

It is preferable that the thickness of the biaxially stretched polyamide film layer 2 is set to 12 to 50 μm.

The thermoplastic resin unstretched film layer (inner layer) 3 undertakes roles of giving excellent chemical resistance against electrolytic solution with strong corrosiveness used for, e.g., lithium-ion secondary batteries and also giving heat sealing performance to the battery case material.

The thermoplastic resin unstretched film layer 3 is not specifically limited, but it is preferably constituted by an unstretched film made from at least one type of thermoplastic resins selected from the group consisting of polyethylene, polypropylene, olefinic series copolymer, acid denaturation thereof and ionomer.

The thickness of the thermoplastic resin unstretched film layer 3 is preferably set to 20 to 80 μm. Setting the thickness to 20 μm or more sufficiently prevents generation of pinholes, and setting the thickness to less than 80 μm reduces the amount of resin to be used, resulting in cost reduction. Above all, it is more preferable that the thickness of the thermoplastic resin unstretched film layer 3 is set to 30 to 50 μm.

Each of the biaxially stretched polyamide film layer 2 and the thermoplastic resin unstretched film layer 3 can be a single layer or a multilayer.

The aluminum foil layer 4 undertakes a role of giving a gas barrier performance which prevents invasion of oxygen and/or moisture into the battery case material. As the aluminum foil layer 4, a foil having a thickness of 5 to 50 μm and made from pure aluminum or Al—Fe series alloy can be preferably used.

Although the first adhesive layer 5 is not specifically limited, urethane series adhesive layer, acrylic series adhesive layer can be exemplified. Above all, it is preferable that the first adhesive layer 5 is a urethane series adhesive layer formed by urethane series two-component reactive adhesive, which allows sharper forming.

The second adhesive layer 6 is not specifically limited, and examples thereof include adhesive layers formed of urethane series resin, acrylic series resin, and resin containing thermoplastic elastomer, as well as acid denaturalized polyolefin, such as, e.g., maleic acid anhydride modified polyethylene and maleic acid anhydride modified polypropylene. The second adhesive layer 6 is formed by, for example, laminating an adhesive resin film (e.g., acid denaturalized polyolefin film) on one side surface of the thermoplastic resin unstretched film layer 3.

In the abovementioned embodiment, the structure including the first adhesive layer 5 and the second adhesive layer 6 is employed. However, it should be noted that these layers 5 and 6 are not essential structural layers and structures with no such layers can be employed.

The battery case material 1 of the present invention is preferably used as a lithium-ion secondary battery case material requiring high volume energy density, but is not specifically limited to this usage.

A battery case can be obtained by subjecting the battery case material 1 of the present invention to forming and shaping (e.g., deep drawing or stretch forming).

EMBODIMENTS

Next, specific embodiments of the present invention will be explained. It should be, however, noted that the present invention is not specifically limited to these embodiments.

Embodiment 1

Figure 2:
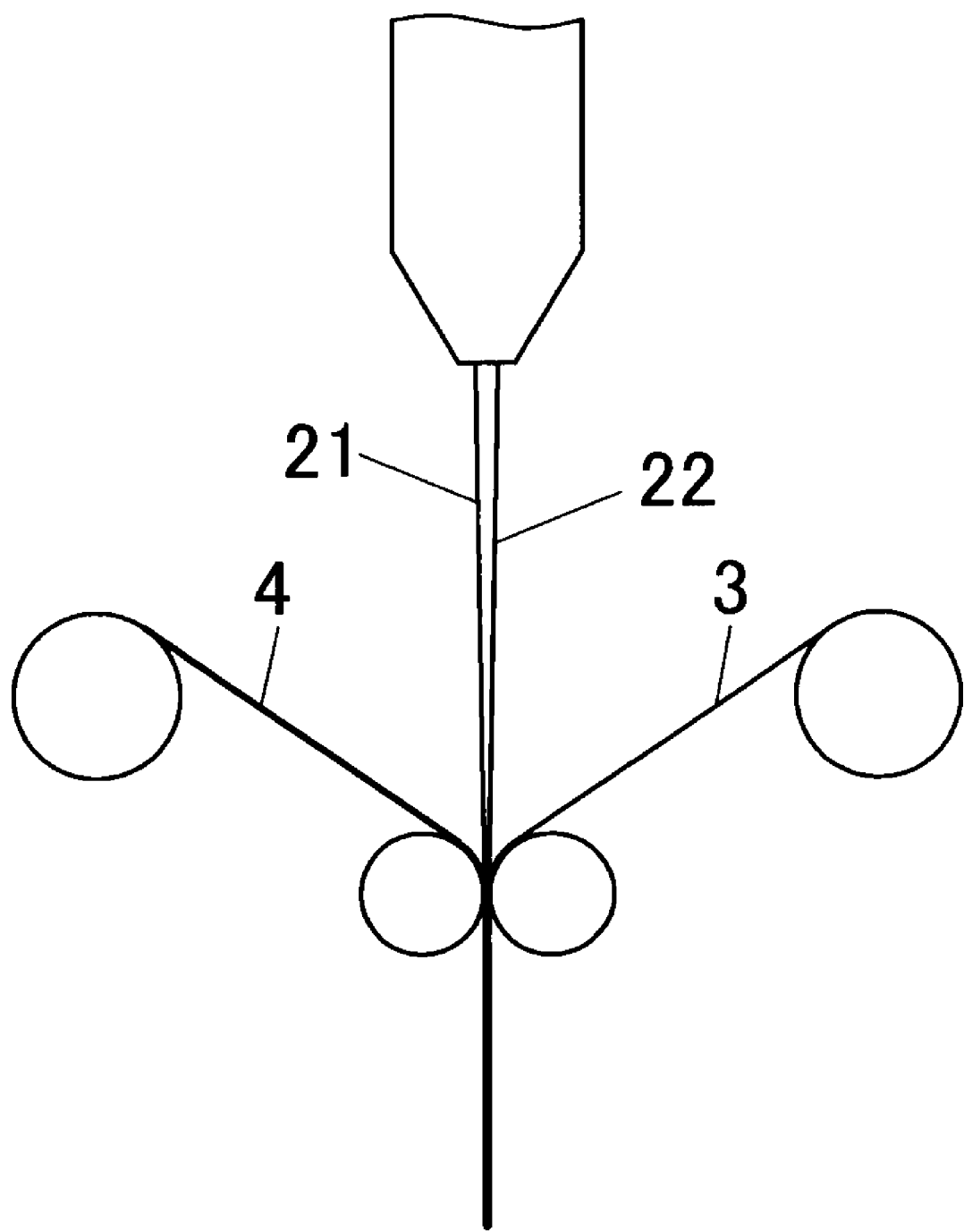
FIG. 2 is a view showing an example of a manufacturing method of a battery case material of the present invention.

As shown in FIG. 2, a maleic acid anhydride modified polyethylene layer 21 having a thickness of 3 μm and an unmodified polypropylene layer 22 having a thickness of 12 μm were coextruded while supplying an aluminum foil (AA8079-O) 4 having a thickness of 40 μm from the left side of the drawing and also supplying an unstretched film 3 having a thickness of 30 μm formed from polypropylene from the right side of the drawing, and the maleic acid anhydride modified polyethylene layer 21 and the unmodified polypropylene layer 22 coextruded were supplied in between the unstretched film 3 and the aluminum foil 4 and pinched with a pair of heating and pressure roller to be heat laminated.

Next, the urethane resin series adhesive material 5 was applied to the surface of the aluminum foil 4 of the obtained laminated film using a gravure roller. After drying the adhesive to some extent by heating, the biaxially stretched film 2 having a thickness of 25 μm and a density of 1,152 kg/m³ and made from nylon was laminated onto the adhesive surface to obtain a battery case material.

The biaxially stretched nylon film 2 having a density of 1,152 kg/m³ was a film obtained by stretching by a simultaneous biaxial stretching method and setting the heat setting temperature at 210° C. during the stretching.

Embodiment 2

A battery case material was obtained in the same manner as in Embodiment 1 except that a biaxially stretched film having a thickness of 20 μm and a density of 1,158 kg/m³ and made from nylon was used instead of the aforementioned biaxially stretched film having a thickness of 25 μm and a density of 1,152 kg/m³ and made from nylon.

The biaxially stretched nylon film having a density of 1,158 kg/m³ was a film obtained by stretching by a simultaneous biaxial stretching method and setting the heat setting temperature at 220° C. during the stretching.

Embodiment 3

A battery case material was obtained in the same manner as in Embodiment 1 except that a biaxially stretched film having a thickness of 15 μm and a density of 1,142 kg/m³ and made from nylon was used instead of the aforementioned biaxially stretched film with a thickness of 25 μm and a density of 1,152 kg/m³ and made from nylon.

The biaxially stretched nylon film having a density of 1,142 kg/m³ was a film obtained by stretching by a simultaneous biaxial stretching method and setting the heat setting temperature at 200° C. during the stretching.

Embodiment 4

A battery case material was obtained in the same manner as in Embodiment 1 except that a biaxially stretched film having a thickness of 20 μm and, a density of 1,144 kg/m³ and made from nylon was used instead of the aforementioned biaxially stretching film having a thickness of 25 μm and a density of 1,152 kg/m³ and made from nylon.

The biaxial stretching nylon film having a density of 1,144 kg/m³ was a film obtained by stretching by a simultaneous biaxial stretching method and setting the heat setting temperature at 203° C. during the stretching.

Embodiment 5

A battery case material was obtained in the same manner as in Embodiment 1 except that a biaxially stretched film having a thickness of 15 μm and a density of 1,146 kg/m³ and made from nylon was used instead of the aforementioned biaxially stretched film having a thickness of 25 μm and a density of 1,152 kg/m³ and made from nylon.

The biaxial stretching nylon film having a density of 1,146 kg/m³ was a film obtained by stretching by a simultaneous biaxial stretching method and setting the heat setting temperature at 205° C. during the stretching.

Embodiment 6

A battery case material was obtained in the same manner as in Embodiment 1 except that a biaxially stretched film having a thickness of 15 μm and a density of 1,138 kg/m³ and made from nylon was used instead of the aforementioned biaxially stretched film having a thickness of 25 μm and a density of 1,152 kg/m³ and made from nylon.

The biaxial stretching nylon film having a density of 1,138 kg/m³ was a film obtained by stretching by a simultaneous biaxial stretching method and setting the heat setting temperature at 198° C. during the stretching.

Embodiment 7

A battery case material was obtained in the same manner as in Embodiment 1 except that a biaxially stretched film having a thickness of 15 μm and a density of 1,132 kg/m³ and made from nylon was used instead of the aforementioned biaxially stretched film having a thickness of 25 μm and a density of 1,152 kg/m' and made from nylon.

The biaxially stretched nylon film having a density of 1,132 kg/m³ was a film obtained by stretching a simultaneous biaxial stretching method and setting the heat setting temperature at 195° C. during the stretching.

Comparative Example 1

A battery case material was obtained in the same manner as in Embodiment 1 except that a biaxially stretched film having a thickness of 20 μm and a density of 1,128 kg/m³ and made from nylon was used instead of the aforementioned biaxially stretched film having a thickness of 25 μm and a density of 1,152 kg/m, and made from nylon.

The biaxially stretched nylon film having a density of 1,128 kg/m³ was a film obtained by stretching by a sequential biaxial stretching method and setting the heat setting temperature at 190° C. during the stretching.

Comparative Example 2

A battery case material was obtained in the same manner as in Embodiment 1 except that a biaxially stretching film having a thickness of 25 μm and a density of 1,165 kg/m³ and made from nylon was used instead of the aforementioned biaxially stretching film having a thickness of 25 μm and a density of 1,152 kg/m³ and made from nylon.

The biaxially stretched nylon film having a density of 1,165 kg/m³ was a film obtained by stretching a sequential biaxial stretching method and setting the heat setting temperature at 230° C. during the stretching.

TABLE 1

| | Structure of the outer layer (biaxially stretched film) | | | Formability | |
|---|---|---|---|---|---|
| | Type of resin | Thickness (μm) | Density (kg/m³) | (6 mm processing) | Delamination |
| Embodiment 1 | nylon | 25 | 1,152 | ◯ | No |
| Embodiment 2 | nylon | 20 | 1,158 | ◯ | No |
| Embodiment 3 | nylon | 15 | 1,142 | ◉ | No |
| Embodiment 4 | nylon | 20 | 1,144 | ◉ | No |
| Embodiment 5 | nylon | 15 | 1,146 | ◉ | No |
| Embodiment 6 | nylon | 15 | 1,138 | ◯ | No |

TABLE 1-continued

| | Structure of the outer layer (biaxially stretched film) | | | Formability | |
|---|---|---|---|---|---|
| | Type of resin | Thickness (μm) | Density (kg/m³) | (6 mm processing) | Delamination |
| Embodiment 7 | nylon | 15 | 1,132 | ○ | No |
| Comparative Example 1 | nylon | 20 | 1,128 | ○ | Yes |
| Comparative Example 2 | nylon | 25 | 1,165 | X | No |

The performance of each of the battery case materials obtained as described above was evaluated based on the following evaluation method.

<Performance Evaluation Method>

The formability of the battery case material was evaluated by making the battery case material into a blank shape of 110×180 mm, performing a deep drawing one step processing with a straight die having a forming height of 6 mm. The results are shown as "⊚" when no cracks was generated, "○" when almost no cracks were formed except for a small limited portion, "Δ" when cracks were formed in significant portions, and "x" when cracks were formed in almost the entire surface. The punch shape of the die used was 60 mm in long side length, 45 mm in short side length, 1 to 2 mm in corner radius R, 1 to 2 mm in punch shoulder radius R, and 0.5 mm in die shoulder radius R.

<Evaluation of Existence of Delamination on the Outer Surface>

After leaving the molded object obtained by the aforementioned deep drawing one step forming process in the drying machine for 3 hours at 80° C., a visual inspection was performed to confirm whether or not delamination (detachment) of the outer layer was occurred.

As it is apparent from the table, the battery case materials of Embodiments 1 to 7 of the present invention were excellent in formability, and could be formed into sharper shapes height in depth, and no delamination of the outer layer was occurred. Especially, the battery case materials of Embodiments 3 to 5 were more excellent in formability.

On the other hand, in Comparative Example 1 in which the density of the outer layer of the stretched polyamide film was less than 1,130 kg/m³, delamination of the outer layer was occurred. Further, in Comparative Example 2 in which the density of the outer layer of the stretched polyamide film exceeded 1,160 kg/m³, the formability was insufficient.

The present invention claims priority to Japanese Patent Application No. 2007-133670 filed on May 21, 2007, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

INDUSTRIAL APPLICABILITY

The battery case material of the present invention can be used as, for example, a battery case material for lithium ion-secondary batteries.

The invention claimed is:

1. A battery case material comprising:
   an outer layer comprising a biaxially stretched polyamide film;
   an inner layer comprising a thermoplastic resin unstretched film; and
   an aluminum foil layer interposed between the outer and inner layers,
   wherein the biaxially stretched polyamide film is obtained by a simultaneous biaxial stretching method and setting a heat setting temperature in a range of 200° C. to 205° C. during stretching of the simultaneous biaxial stretching method, and the biaxially stretched polyamide film has a density of 1,142 to 1,146 kg/m³.

2. The battery case material as recited in claim 1, wherein the biaxially stretched polyamide film is a biaxially stretched nylon film and is 15 to 20 μm in thickness.

3. The battery case material as recited in claim 1, wherein the biaxially stretched polyamide film is 12 to 50 μm in thickness, the thermoplastic resin unstretched film is 20 to 80 μm in thickness, and the aluminum foil layer is 5 to 50 μm in thickness.

4. The battery case material as recited in claim 1, further comprising a urethane series adhesive layer, wherein the biaxially stretched polyamide film and the aluminum foil layer are integrally laminated via the urethane series adhesive layer.

5. A battery case comprising a battery case material according to claim 1, wherein the battery material is formed by deep drawing.

6. A battery case comprising a battery case material according to claim 1, wherein the battery material is formed by stretch forming.

7. The battery case material as recited in claim 1, wherein the biaxially stretched polyamide film is a biaxially stretched nylon film.

8. The battery case material as recited in claim 1, wherein the biaxially stretched polyamide film is 12 to 50 μm in thickness.

9. The battery case material as recited in claim 1, wherein the biaxially stretched polyamide film is 12 to 50 μm in thickness, and the biaxially stretched polyamide film is a biaxially stretched nylon film.

10. The battery case material as recited in claim 1, wherein the biaxially stretched polyamide film is 15 to 20 μm in thickness.

11. The battery case material as recited in claim 3, wherein the biaxially stretched polyamide film is 15 to 20 μm in thickness, and the biaxially stretched polyamide film is a biaxially stretched nylon film.

\* \* \* \* \*